April 3, 1956   P. H. TAYLOR   2,740,625
LIQUID SPRING
Filed March 16, 1954
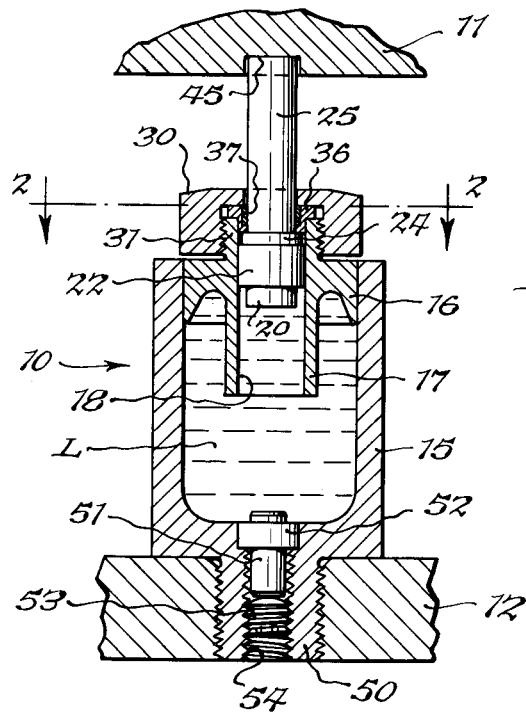
Fig. 1.
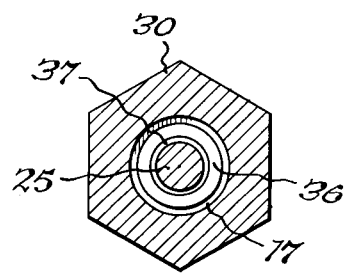
Fig. 2.
Fig. 3.
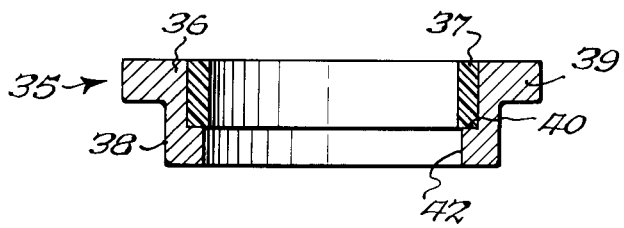
INVENTOR.
Paul H. Taylor
BY
/s/ B. Schlesinger
Attorney.

United States Patent Office 2,740,625
Patented Apr. 3, 1956

2,740,625
LIQUID SPRING

Paul H. Taylor, Grand Island, N. Y., assignor to Wales-Strippit Corporation, North Tonawanda, N. Y., a corporation of New York Application March 16, 1954, Serial No. 416,613

5 Claims. (Cl. 267—64)

The present invention relates to liquid springs, and more particularly to seal rings and guide members for use in such springs.

The type of liquid spring, to which the present invention particularly relates, comprises a container filled with a compressible liquid and provided with a guide cylinder, and a piston reciprocably mounted in said cylinder. The container is open at one end. The piston has a piston rod rigid with it which projects outwardly through the open end of the container. The container and the piston rod are interposed between the two relatively movable parts which are resiliently connected by the liquid spring. When a force or load is applied to one of these two relatively movable parts, then, the piston is forced inwardly of the container, compressing the liquid in the container. When the force or load is released, the liquid expands, returning the piston and piston rod. The piston carries a resilient sealing member made, for instance, of nylon. This sealing member engages the wall of the cylinder, in which the piston reciprocates, to prevent leakage of the compressible liquid between the piston and cylinder as the piston reciprocates in the cylinder. Further to prevent leakage, it has been the practice heretofore to provide a plastic sealing member at the outside end of the cylinder, through which the piston rod extends. This latter sealing member acts, also, as a guide for the piston rod and piston. Conventionally it is also made of nylon. It is conventionally placed between the retaining nut, which serves to limit outward movement of the piston, and the piston itself.

The nylon guide member has many advantages. Being slightly resilient, it bears tightly against the piston rod, holding it and the piston in tight guide alignment with the cylinder in which the piston operates. It prevents entry of dust and dirt into the cylinder. It supports the piston rod away from the bore of the steel retaining nut in which the piston rod reciprocates, so that scoring or galling of the piston rod does not occur.

The construction described has proved to be completely satisfactory where the pre-load pressure on the spring is about 3000 p. s. i. or less. However, when the pre-load pressure exceeds 3000 p. s. i. it has been found that the nylon guide member is extruded due to the pressure of the piston against the nylon on the return stroke of the piston. When the nylon guide member extrudes, leakage of the compressible liquid results; and the spring is rendered useless. For this reason, it has heretofore not been practical to utilize liquid springs where initial preload pressures over 3000 p. s. i. are encountered.

The primary object of the present invention is to provide a liquid spring which will operate satisfactorily at pressures in excess of 3000 p. s. i.

Another object of the invention is to provide an improved seal and guide member for a liquid spring of the character described which will have all of the advantages of the nylon guide and seal heretofore employed, but which will be subject to none of the disadvantages of the known type guide and seal.

Another object of the invention is to provide a combined seal and guide member for a liquid spring of the character described, which is of composite construction, having one part for readily taking the thrust of the piston on its return stroke, and another part which is resilient and which guides the piston rod and piston while sealing about the piston rod.

Another object of the invention is to provide a seal and guide member of the character described in which the guide member is made of nylon or similar resilient plastic material and is so constructed that it will not extrude even when subjected to a preload pressure of over 3,000 p. s. i.

Other objects of the invention will be apparent hereinafter from the description and from the recital of the appended claims.

In the drawing:

Fig. 1 is an axial section of a liquid spring equipped with a combined sealing ring and guide member made according to one embodiment of the present invention;

Fig. 2 is a transverse section through the sealing ring and guide member taken on the line 2—2 of Fig. 1, looking in the direction of the arrows; and Fig. 3 is an enlarged axial section of the combined sealing ring and guide member.

Referring now to the drawing by numerals of reference, 10 denotes an improved liquid spring constructed according to the present invention. This spring, of course, may be used in many widely different applications, but is shown positioned between the stripper plate 11 and the die shoe 12 of a conventional die.

The spring comprises a container 15 which is adapted to be filled with a compressible liquid L, such as, for instance, a silicone base compressible oil. The container 15 is closed at its lower end and has a piston carrying head 16 at its upper end. The head 16 is welded or otherwise affixed in the container 20 so that leakage cannot occur between the head and the container. The head is formed with a central tubular portion 17 that extends downwardly into the container 15 and that also projects upwardly beyond the container. The tubular portion 17 forms a cylinder 18 in which the piston 20 of the spring reciprocates.

The piston 20 carries a conventional seal 22 which is preferably made of a resilient plastic material, such as nylon, and which bears on the inside wall of the cylinder 18 to guide the piston in its reciprocating movement, and to seal against leakage between the piston and the cylinder. This seal, which is conventionally in the form of a sleeve, may be seated in conventional manner against the piston shoulder 24.

The piston has an integral rod or shank portion 25 which projects outwardly of the container 15 through the outer end of the cylinder 18.

To retain the piston in the cylinder, and to limit its outward movement, a retaining nut 30 is threaded onto the threaded neck portion 31 of the container head 16.

To guide the piston rod 25 and the piston 20 in their reciprocating movements and further to prevent leakage of the compressible liquid from the spring, the combined sealing ring and guide member of the present invention is provided.

This combined sealing ring and guide member is denoted at 35 (Fig. 3). It comprises a bored steel ring or shell 36, and a tubular guide sleeve 37. The ring or shell 36 has a cylindrical peripheral surface 38, and a flange portion 39. The ring or shell is adapted to be mounted so that its portion 38 seats in the upper end of the cylinder 18 and its flange 39 seats against the upper face of the tubular portion 17 of the head 16.

The ring or shell 36 is counter-bored to provide an internal shoulder 40 against which the tubular guide sleeve 37 seats. This guide sleeve may be made of nylon or other suitable plastic, resilient material molded into the counterbore. The steel ring or shell 36 and the tubular guide sleeve 37 are mounted so that their bores are coaxial with the bore of the cylinder 18. The guide sleeve 37 is positioned to surround the piston rod 25 and to act as a guide for the piston rod as the piston rod reciprocates. The guide sleeve 37 has a bore smaller than the bore of the steel ring 36 so that the guide sleeve 37 extends inwardly radially beyond the wall 42 of the bore of the ring or shell 36. Thus, the bore of the ring 36 does not bear against the piston rod 25; but it is only the guide sleeve 37 which bears against the piston rod 25 and acts as a guide therefor.

The combined sealing ring and guide member 35 is disposed between the retainer nut 30 and the opposed face of the head 16. The ring or shell 36, therefore, takes the thrust of the piston 20 on the return stroke of the piston, and protects the guide sleeve 37 against such thrust, eliminating any internal pressure on the nylon which would tend to extrude it. The guide sleeve 37, on the other hand, holds the piston rod 25 out of sliding contact with the ring or shell 36, thus preventing scoring or galling of the ring or shell 36. Being resilient, the guide sleeve 37 also acts to seal against leakage of the compressible liquid L along the piston rod. Being resilient, too, it acts as a guide for the piston rod and the piston in their respective movements. Because the thrusts of the piston are taken by the steel ring 36 extrusion of the plastic guide member 37 due to such thrust is prevented. A combined seal and guide member has, therefore, been provided which will permit operation of a liquid spring at pressures in excess of 3000 p. s. i.

In the embodiment of the invention shown, the spring is interposed, as previously stated, between the stripper plate 11 and the die shoe 12 of a die. The upper end of the piston rod seats in a recess 45 in the lower face of the stripper plate 11. The closed end of the container 15 has a projecting portion 50 which threads into the die shoe 12. A conventional force adjustment means is provided within the projecting portion 50 for preloading the spring. It comprises a piston or plunger 51 that is mounted to be slidably adjustable in a seal 52 that is secured in the container 15. A set-screw 53, which threads into the threaded bore 54 of the projection 50, serves to adjust the plunger 51, and thereby to adjust the preload of the spring.

As previously stated, the ring or shell 36 will take the return thrust of the piston 20. The guide sleeve 37 performs several important functions. It acts as a bearing for the piston rod 25. It prevents leakage along the piston rod 25. It acts as a guide for the piston rod 25. It holds the piston rod 25 out of contact with the ring or shell 36 and the nut 30, thereby preventing scoring and galling of these parts as the piston reciprocates. It acts, also, as a secondary seal against dust and dirt getting down to the piston where it might damage the primary seal 22. The present invention, therefore, provides a seal and guide member which extends very much the usefulness of liquid springs.

While the invention has been described in connection with a specific embodiment thereof, it will be understood that it is capable of further modification, and this application is intended to cover any variations, uses, or adaptations of the invention following, in general, the principles of the invention, and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A liquid spring comprising a container filled with a compressible liquid, a bored guide cylinder rigid with said container, the bore of said cylinder being open at both ends and communicating at its inner end with said container, a piston reciprocable in said bore and having a piston rod rigid therewith which is of less diameter than said piston and which projects outwardly through the outer open end of said bore, and means for closing said outer open end comprising a rigid stop member mounted in the outer open end of said bore in position to engage and to limit outward movement of said piston, said stop member having a cylindrical portion whose outside diameter is substantially equal to the diameter of said bore to fit tightly therein, and said stop member having a bore, the diameter of which is larger than the diameter of said piston rod, but less than the diameter of said piston, whereby its inner end acts as a stop for said piston, a resilient sleeve mounted in a counterbore in said stop member axially beyond the inner end of said stop member, said sleeve surrounding said piston rod and having a cylindrical bore whose normal diameter is slightly less than the diameter of said piston rod, whereby said sleeve has guiding, bearing, and sealing engagement with said piston rod, and means for holding said stop member and said sleeve in said container against axial movement relative thereto.

2. A liquid spring comprising a container filled with a compressible liquid, a bored guide cylinder rigid with said container, the bore of said cylinder being open at both ends and communicating at its inner end with said container, a piston reciprocable in said bore and having a piston rod rigid therewith which is of less diameter than said piston and which projects outwardly through the outer open end of said bore, a resilient sealing member mounted on said piston to engage said bore, and means for closing said outer open end of said bore comprising a rigid stop ring which has a cylindrical portion whose outside diameter is equal substantially to the inside diameter of said bore and which is positioned in the outer open end of said bore to engage and limit outward movement of said piston, said ring being counterbored from its outer end, a single, resilient sealing sleeve seated in the counterbore of said ring and having a length equal to the axial length of said counterbore, said sleeve surrounding said piston rod and having a cylindrical bore whose diameter is slightly less than the diameter of said piston rod, whereby said sleeve has guiding, bearing, and sealing engagement with said rod, the outer ends of said stop ring and of said sleeve being flush with each other, and means engaging the outer ends of said stop ring and said sleeve for securing said stop ring and sleeve against axial movement relative to said cylinder and for holding said stop ring and sleeve in operative position on said container.

3. A liquid spring comprising a container having at one end an externally threaded neck portion and having a bored cylinder rigid therewith, the bore of said cylinder extending through said neck portion and being open at both ends and communicating at its inner end with said container, said container and cylinder being filled with a compressible liquid, a piston reciprocable in said bore and having a piston rod rigid therewith which is of less diameter than said piston and which projects outwardly through the outer open end of said bore, and means for closing said outer open end comprising a rigid stop ring fitting tightly into said bore and having a flange portion seating against the outer face of said neck portion, said ring having a bore of larger diameter than the diameter of said piston rod but of less diameter than said piston, said ring being counterbored from its outer end, a resilient, plastic sleeve seated in the counterbore, said sleeve surrounding said piston rod and having a cylindrical bore of smaller diameter than the diameter of said piston rod, whereby it engages said piston rod with guiding and sealing engagement, and a nut threading on said neck portion and engaging both the flange portion of said stop ring and said sleeve to hold both said ring and said sleeve in operative positions, said nut being bored for passage therethrough of said piston rod, the bore of said nut being greater than the diameter of said piston rod to provide clearance between said nut and said piston rod.

4. A liquid spring comprising a metallic container having a bored guide cylinder rigid therewith, the bore of said cylinder being open at both ends and communicating at its inner end with said container, a metallic piston reciprocable in said bore and having a metallic piston rod rigid therewith which is of less diameter than said piston and which projects outwardly through the outer open end of said bore, and means for closing said outer open end comprising a rigid metallic stop member mounted in the outer open end of said bore in position to engage and to limit outward movement of said piston, said stop member having a cylindrical portion whose outside diameter is substantially equal to the diameter of said bore to fit tightly therein, and said stop member having a bore, the diameter of which is larger than the diameter of said piston rod but less than the diameter of said piston, whereby its inner end acts as a stop for said piston, a resilient sleeve mounted in a counterbore in said stop member axially beyond the inner end of said stop member, said sleeve surrounding said piston rod and having a cylindrical bore whose normal diameter is slightly less than the diameter of said piston rod, whereby said sleeve has guiding, bearing, and sealing engagement with said piston rod, and means for holding both said stop member and said sleeve in said cylinder against axial movement relative thereto, said container and cylinder being filled with a highly compressible liquid which has an aversion to bearing contact of metallic elements, said liquid being adapted to be preloaded with a preload force greater than can be borne by said sleeve.

5. A liquid spring comprising a container filled with a compressible liquid, a steel bored guide cylinder rigid with said container, the bore of said cylinder being open at both ends and communicating at its inner end with said container, a steel piston reciprocable in said bore and having a steel piston rod rigid therewith which is of less diameter than said piston and which projects outwardly through the outer end of said bore, a resilient nylon sealing member mounted on said piston to engage said bore, and means for closing said outer open end of said bore comprising a rigid stop member mounted in the outer open end of said bore in position to engage and to limit outward movement of said piston, said stop member having a cylindrical portion whose outside diameter is substantially equal to the diameter of said bore to fit tightly therein, and said stop member having a bore, the diameter of which is larger than the diameter of said piston rod but less than the diameter of said piston, whereby its inner end acts as a stop for said piston, and a resilient, nylon sleeve mounted in a counterbore in said stop member axially beyond the inner end of said stop member, said sleeve having a length equal to the axial length of said counterbore and surrounding said piston rod and having a cylindrical bore whose normal diameter is slightly less than the diameter of said piston rod, whereby said sleeve has guiding, bearing, and sealing engagement with said piston rod, and means for holding said stop member and said sleeve in said container against axial movement relative thereto.

References Cited in the file of this patent

UNITED STATES PATENTS

| 1,807,555 | Ruggles | May 26, 1931 |
| 2,667,348 | Frye et al. | Jan. 26, 1954 |

FOREIGN PATENTS

| 877,943 | France | Sept. 24, 1942 |